United States Patent [19]

Battegazzore

[11] Patent Number: 4,936,490
[45] Date of Patent: Jun. 26, 1990

[54] BOTTLE FOR GENERIC MEDICAL PRODUCTS, IN PARTICULAR SYRUPS

[75] Inventor: Piero Battegazzore, Alessandria, Italy

[73] Assignee: Guala S.p.A., Alessandria, Italy

[21] Appl. No.: 163,644

[22] Filed: Mar. 3, 1988

[30] Foreign Application Priority Data

Mar. 3, 1987 [IT] Italy ................. 19555 A/87

[51] Int. Cl.$^5$ ............................... B67D 5/06
[52] U.S. Cl. ..................... 222/205; 222/211; 222/110; 222/318; 222/464
[58] Field of Search ............ 222/205, 207, 211, 110, 222/149, 151, 464, 318, 424, 578, 580, 581

[56] References Cited

U.S. PATENT DOCUMENTS

| | | | |
|---|---|---|---|
| 1,932,765 | 10/1933 | Bienenstein | 222/578 |
| 2,203,475 | 6/1940 | Terry | 222/205 X |
| 3,767,088 | 10/1973 | Deussen | 222/205 |
| 4,162,749 | 7/1979 | Bennett | 222/207 X |
| 4,548,524 | 10/1985 | Seager | 222/205 X |

FOREIGN PATENT DOCUMENTS 998021 10/1976 Canada ................. 222/211

Primary Examiner—Joseph J. Rolla
Assistant Examiner—Boris Milef
Attorney, Agent, or Firm—Notaro & Michalos

[57] ABSTRACT

A bottle for syrups, which affords precise dosages of a syrup in an accurate and hygienically satisfactory manner, comprises a container in bottle form which extends between a bottle bottom and a bottle neck, a cap-type stopper removably associated with the bottle neck, a syringe device having a respectively cylinder associated with the bottle neck and defining a chamber having a set volume equal to a single dose, which chamber is in fluid communication with said bottle bottom through a conduit, and a respectively plunger associated with the cap-type stopper and being movable within said cylinder on removal of the cap to such up a dose from the bottle bottom.

3 Claims, 2 Drawing Sheets

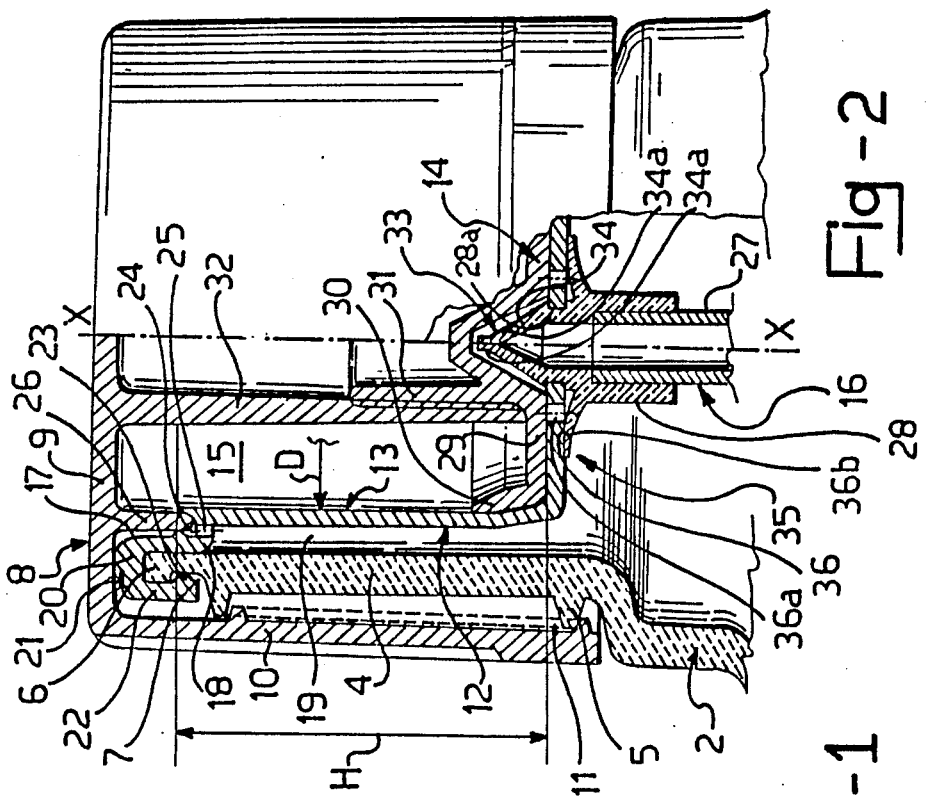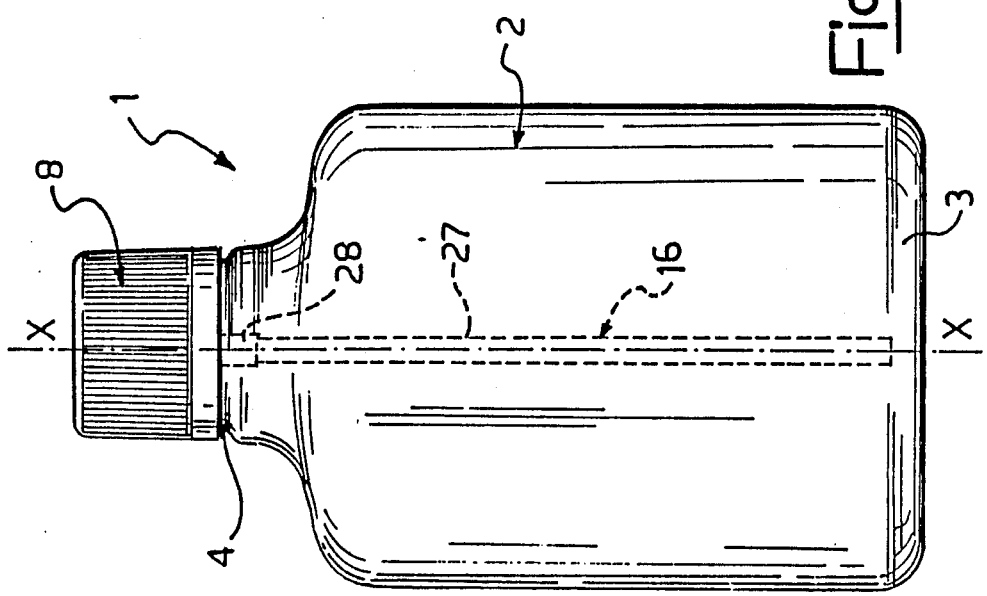

though any other suitable material may be used instead, which has an outside diameter equal to the inside diameter D of the chamber 15 and is adapted to slide sealingly within the cylinder 13.

BOTTLE FOR GENERIC MEDICAL PRODUCTS, IN PARTICULAR SYRUPS

FIELD AND BACKGROUND OF THE INVENTION

This invention relates to a bottle for containing generic medicinal products, and more specifically syrups, of a type which comprises a container in bottle form extending between a bottle bottom and a bottle neck, and a cap-type stopper removably associated with the bottle neck.

The administration of syrups and the like medicinal products requires that the administered amount thereof be metered in agreement with the physician's prescription.

It is current practice to administer such dosages by means of a spoon. This practice, while being a widespread one, involves the availability of or a search for a spoon, leaves much to be desired from the hygienic standpoint, and is quite inadequate to provide accurately determined dosages.

It has been proposed of accompanying the bottle with a suitable small measure of plastics. This approach eliminates the need for a spoon. As regards hygiene, however, it is still quite unsatisfactory. As for the dosage accuracy, the situation is only slightly improved. In fact, and especially with the elderly, a precise dosage is difficult to achieve.

It has also been suggested of using for a measure the bottle cap itself. This is quite a straightforward approach, but one that leads to some syrup going wasted and fouling the bottle exterior. A precise dosage, moreover, is again to be achieved with difficulty.

SUMMARY OF THE INVENTION

The problem which underlies this invention is to provide a bottle having such constructional and operational features as to meet the above-noted demand, while overcoming at the same time the drawbacks noted in connection with the background art.

This problem is solved by a bottle of the type specified being characterized in that it comprises a syringe device having a respective cylinder associated with the bottle neck and defining a chamber with a set volume equal to a single dose, said chamber being in fluid communication with said bottle bottom through a conduit, and a respective plunger associated with the bottle cap and being movable within said cylinder on removing the cap to suck up a dose.

Further features and the advantages of the bottle according to this invention will be more clearly understood from the following detailed description of a preferred embodiment thereof, to be taken by way of example and not of limitation with reference to the accompanying drawings.

BRIEF DESCRIPTION OF THE DRAWING

FIG. 1 is an elevation view of a bottle according to the invention;

FIG. 2 is an elevation view, in cross-section and to an enlarged scale, of a detail of the bottle shown in FIG. 1.

DESCRIPTION OF THE PREFERRED EMBODIMENT

Figure 4:
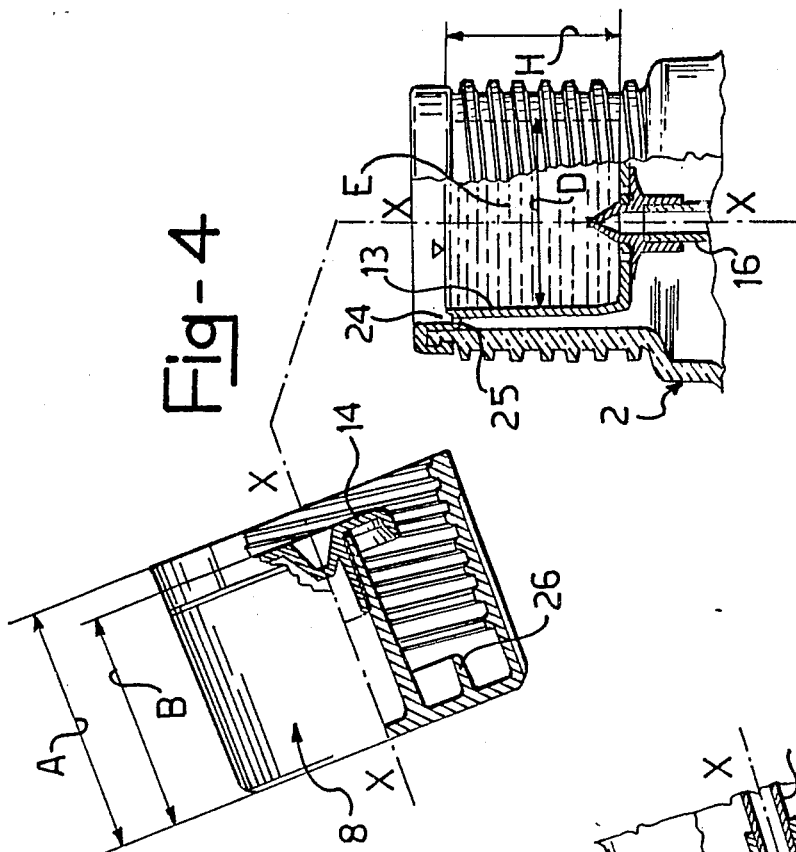
FIGS. 3, 4 and 5 are sectional views of the bottle of FIG. 1, shown at different stages of its operation.
Figure 5:
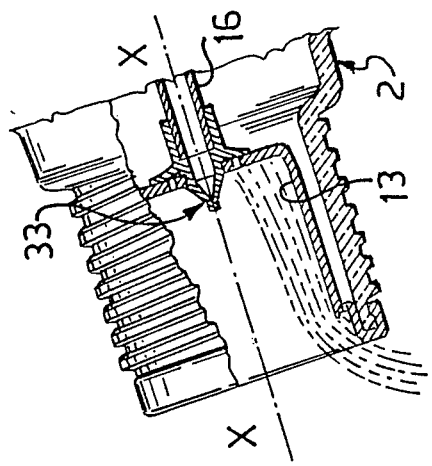

With reference to the drawing views, the numeral 1 designates generally a bottle for containing a syrup or the like medicinal product, which comprises a container 2 of bottle form having an X—X axis.

The container 2 extends between a bottle bottom 3 and bottle neck 4.

Being formed from glass or a suitable rigid plastics, the container 2 may have, for example, a capacity of 100 $cm^3$.

A coarse outside screw thread formation 5 having, for example, a 12 mm long pitch is provided along a major section of the bottle neck 4.

The neck 4 has an annular rim 6 at its free end which is formed externally with an annular groove 7.

Indicated at 8 is a cap-type stopper removably associated with the neck 4. It is formed from a suitable plastics, such as polypropylene, and has a flat top 9 and a cylindrical skirt 10 having a set height dimension A. Internally of the cylindrical skirt 10, there are formed inside screw threads 11 mating with the screw threads 5 and adapted to be threadably engaged therewith.

The bottle 1 of this invention further comprises a syringe device, generally indicated at 12, which is effective to dispense single syrup doses.

The syringe device 12 includes a respective cylinder or barrel 13 associated with the neck 4 of the container 2, and a respective plunger 14 associated with the cap 8 and being movable within said cylinder 13.

The cylinder 13 defines a chamber 15 having an inside diameter D and a height H selected to have the chamber volume equal to a desired syrup dose, e.g. of 5 $cm^3$.

The cylinder 13 is in fluid communication with the container 2 through a tubular conduit 16 dipped into the container 2 to a location level with its bottom 3.

The cylinder 13 is provided at the top with an annular flange 17 which juts outwards and fits over the rim 6.

In particular, the flange 17 has a first portion 18 fitting into the neck 4 in a guided manner, with an interspace 19 being defined between the neck 4 and the cylinder 13, a second portion 20 abutting the rim 6 of the neck 4 and being provided at the top with an annular lip seal 21 adapted to be engaged by the top 9 of the cap 8, and a third portion 22 extending externally of the rim 6 and being provided internally with an annular projection 23 adapted to engage in the groove 7 by snap action to retain the cylinder 13 positively to the neck 4.

At the portion 18 of the flange 17, there is formed an annular channel 24 whose bottom has holes 25 formed therein which open into the interspace 19, which holes constitute vent holes for the container 2. The holes 25 are capillary holes, thereby letting air through them but inhibiting in practice the passage of syrup.

To shut off the holes 25, the cap 8 is provided with a tubular lug 26 depending from its top 9, which would sealingly engage with said channel 24 endwise as a shutter for the holes 25.

The tubular conduit 16 is embodied by a small plastics tube 27, e.g. made of polyethylene, carrying at its upper end a wall-pass end fitting 28 formed from a plastic material such as an elastomer.

The end fitting 28 is snap fitted into a bore 28a provided at the bottom of the cylinder 13.

The plunger 14 of the syringe device 12 consists of a disk-shaped element 29 of plastics, e.g. of polyethylene, which is provided peripherally with an annular lip seal 30 in tight sealed relationship with the cylinder 13, and a tubular center portion 31 snugly inserted plug-fashion into a tubular lug 32 depending from the top 9 of the cap 8.

It should be noted that the tubular lug 32 has a set height dimension B, smaller than the height A, thereby the plunger will not stand proud of the cap but remain instead in a position fully within it.

Advantageously, the syringe device 12 of the inventive bottle comprises a valve means 33 formed on the tubular conduit 16 to admit syrup into the chamber 15 but prevent it from flowing out.

The valve means 33 includes a check valve 34 of the duckbill type, whose bills 34a are formed integrally with the end fitting 28.

Also advantageously, the syringe device 12 of the inventive bottle includes an additional valve means, indicated at 35, formed in the cylinder 13 bottom to prevent air from passing to the chamber 15 from the container, and to permit air and syrup to pass from the chamber 15 to the container on a set pressure level being exceeded.

This valve means consists of a check valve 36 of the flap type having plural holes 36a formed in the cylinder 13 bottom and an elastically deformable flap 36b of set rigidity which is held in pressure contact from below with the cylinder 13 across said holes 36a. The elastic flap 36b is advantageously formed integrally with the end fitting 28.

Figure 3:
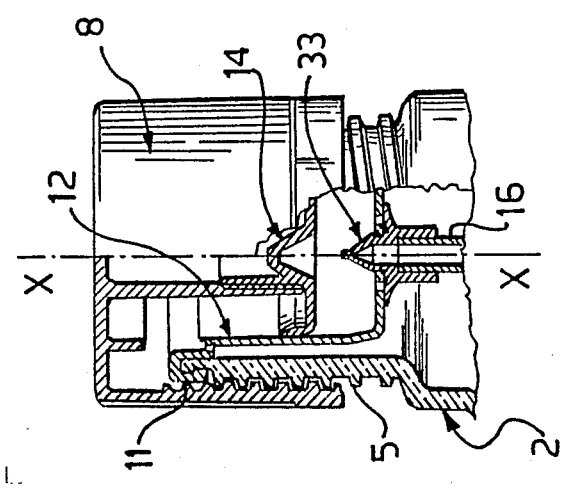

To have a single dose of the syrup dispensed from this bottle, it will be sufficient to screw the cap 8 out of the neck 4. As the cap 8 is being screwed out, the plunger 14 associated therewith will be displaced within the cylinder 13, in an outward direction therefrom, to thus cause syrup to be drawn out of the container 2, through the conduit 16 into the chamber 15, as the check valve 34 is opened (see FIG. 3). At this stage, the check valve 36 would be left closed.

As the cap unscrewing is continued, the plunger 14 will come out of the cylinder 13 and leave the chamber 15 filled with an amount of the syrup which is exactly equal to its volume and, hence, to the target dose.

On completion of the cap unscrewing, the cap 8 would be removed to let the dose accessible (see FIG. 4). The administration of the latter takes place by either drinking it directly off the bottle neck or pouring the dose into a drinking glass or another preferred container.

At this moment, the cap 8 would screwed back onto the neck 4 by application of an appropriate force. Thus, the plunger 14 is driven back into the cylinder 13 by an inward movement. During the inward movement of the plunger 14, the lip seal 30 will scrape the cylinder 13 wall and remove therefrom any syrup residue. Air and syrup residue will be pushed out of the chamber 15 into the container 2 via the check valve 36, which is now opened on its set opening pressure being reached.

It should be noted that during the insertion of the plunger 14 into the cylinder 13, the duckbill check valve 34 is held closed. As a result, the conduit 16 is kept in a filled state, which enhances the constant dosage feature.

With the cap tightened down, the starting condition is restored and the bottle is ready to dispense a fresh dose, according to necessity.

It should be noted that during the plunger displacement through the cylinder, whether in the outward or inward direction, the vent holes 25 will maintain atmospheric pressure within the container 2. With the cap tightened down, the vent holes 25 are shut off by the shutter 26, and any incidental transfer of syrup from the container 2 into the chamber 15 will be prevented on a long-term basis.

The main advantage of the bottle according to the invention is that it enables syrup to be metered out with hitherto unachievable accuracy. The dose is formed, in fact, automatically on screwing the cap out, leaving no margin for error.

The bottle of this invention lends therefore itself for use by the child and the elderly as well; the low degree of dexterity that characterizes such users cannot impair the accuracy of the dose formed.

A further advantage of the inventive bottle is that its operation is also fully satisfactory from the sanitary standpoint. In fact, the dose is formed within the bottle neck, inside the chamber of a cylinder which would be protected normally by the bottle cap. Also hygienically satisfactory is the way the cap is handled, since irrespective of how it is laid down, it cannot cause the plunger to become contaminated.

Still another advantage of the bottle according to this invention is that it can be made to accommodate a range of different dosages by merely providing a number of cylinders, each with a different value of the height H. As an example, one half the height dimension of the cylinder 13 would provide a bottle for syrups to be administered to children, in 2.5 cm$^3$ doses.

Note should also be taken of that the inventive bottle is simple construction-wise and formed of parts which can be manufactured on a mass-production basis, a better than negligible advantage with a disposable article after use.

It stands to reason that a skilled person in the art may, in order to meet specific and contingent requirements, apply numerous modifications and alterations to the bottle disclosed hereinabove, without departing thereby from the protection scope of the invention as set forth in the appended claims.

I claim:

1. A bottle for containing and dispensing generic medicinal products, in particular syrups, comprising:
   a container in bottle form having a neck and a bottom, the bottle neck being providing with a top rim;
   a cap-type stopper removably associated with the bottle neck and engageable with the outside of the bottle neck;
   a cylinder extending axially on the inside of the bottle neck and provided with an open top end and a bottom end which is closed by a bottom wall, said top end of said cylinder being connected to the bottle neck, said cylinder defining a chamber with a selected volume which is equal to a single dose of the syrup to be dispensed;
   a plunger connected to said stopper and extending axially inside said cylinder through the open top end of said cylinder, said plunger being axially displaceable upon removal of said stopper from said bottle neck;
   said cylinder and said plunger together forming a syringe device;
   a first and a second aperture in said bottom wall of said cylinder for providing fluid communication between said cylinder and said container;

a conduit having a first end connected to said first aperture and extending inside said container, said conduit having an opposite end extending to the bottom of said container;

first one way valve means in said first aperture for admitting syrup into said chamber when drawn from said container by displacement of said plunger from said cylinder, while preventing a flow of syrup from said chamber into said container; and second one way valve means in said second aperture for preventing air from passing to said chamber from said container while permitting air and syrup to pass from said chamber into said container when a selected pressure level is exceeded in said chamber by displacement of said plunger into said cylinder.

2. A bottle according to claim 1 further comprising an annular space between said cylinder and said bottle neck in free fluid communication with said container, an annular flange extending radially and outwardly from said top end of said cylinder and fitted over and to said top rim of said bottle neck, a plurality of capillary vent holes in said annular flange, and a tubular lug extending from said stopper toward said flange and into engagement with said plurality of capillary vent holes when said stopper is engaged to close said bottle neck for closing said capillary vent holes, whereby as said stopper is placed onto said bottle neck, said plunger slides into said cylinder displacing syrup and air through said second aperture and past said second one way valve means until said tubular lug is engaged against said flange to close said capillary vent holes.

3. A bottle according to claim 2 wherein said first one way valve means comprises a duckbill check valve extending upwardly into said chamber of said cylinder at an upper end of said conduit, said second one way valve means comprising an elastic flap check valve for engagement over said second aperture and for displacement away from said second aperture when syrup and air is forced through said second aperture from said chamber into said container.

* * * * *